United States Patent [19]
Kwoh

[11] Patent Number: 5,852,478
[45] Date of Patent: Dec. 22, 1998

[54] VPS COMPATIBLE APPARATUS AND METHOD FOR SELECTION OF CORRECT IR CODE SETS

[75] Inventor: Daniel S. Kwoh, Flintridge, Calif.

[73] Assignee: Gemstar Development Corporation, Pasadena, Calif.

[21] Appl. No.: 862,592

[22] Filed: May 23, 1997

Related U.S. Application Data

[63] Continuation of Ser. No. 440,191, May 12, 1995, abandoned.

[51] Int. Cl.$^6$ .............................. H04N 5/44; H04N 5/91; H04B 1/18
[52] U.S. Cl. .......................... 348/734; 386/83; 455/151.2
[58] Field of Search .................................. 386/83, 95, 46, 386/1; 348/731, 732, 733, 734, 460, 468, 461, 465; 360/33.1, 69; 455/151.1, 151.2, 151.4

[56] References Cited

U.S. PATENT DOCUMENTS

| | | | |
|---|---|---|---|
| 5,138,649 | 8/1992 | Krisbergh et al. | 379/56 |
| 5,307,173 | 4/1994 | Yuen et al. | 358/335 |
| 5,335,079 | 8/1994 | Yuen et al. | 358/335 |
| 5,365,282 | 11/1994 | Levine | 348/734 |
| 5,373,330 | 12/1994 | Levine | 348/734 |
| 5,386,251 | 1/1995 | Movshovich | 348/734 |
| 5,412,377 | 5/1995 | Evans et al. | 340/825.22 |
| 5,420,647 | 5/1995 | Levine | 348/734 |
| 5,450,135 | 9/1995 | Schick | 348/732 |
| 5,473,442 | 12/1995 | Kim et al. | 358/335 |
| 5,479,267 | 12/1995 | Hashimoto | 358/335 |
| 5,479,268 | 12/1995 | Young et al. | 358/335 |

FOREIGN PATENT DOCUMENTS

| | | |
|---|---|---|
| 0492298 | 7/1992 | European Pat. Off. . |
| 0577283 | 1/1994 | European Pat. Off. . |

OTHER PUBLICATIONS

Sommerhauser, W., Video Program System: Flexible Programming by VPS, Funkschau, pp:1–19, (translated), Dec. 1985.

Beakhust, D.J., Teltext and Viewdata–A Comprehnsive Component Solution, Proced. Inst. Elect. Eng., (London) v 126 n 12 PP:1374–1396, Dec. 1979.

*Primary Examiner*—Douglas W. Olms
*Assistant Examiner*—David R. Vincent
*Attorney, Agent, or Firm*—Christie, Parker & Hale, LLP

[57] ABSTRACT

An embodiment of the present invention is a method for programming a controller for selection, from a plurality a set of infra red (IR) codes, set of IR codes for subsequent control of IR signal communication with a video cassette recorder (VCR). Each set of IR codes is for communicating with a different corresponding VCR. To this end, each such VCR has a tuner, which, when tuned to an actual channel of broadcast video signals, provides video signals derived from the actual channel to a video output thereof. A signal is provided to the VCR where the signal is predetermined by a selected IR code which is selected from one of the sets of IR codes. This causes the VCR to perform a predetermined operation. The video output of the VCR is monitored for a predetermined signal condition, such as a video signal being present, or for a label broadcast in the video signals. A set of IR codes is then selected for subsequent signal communication with the VCR. The set of IR codes which is selected is the one from which the selected IR code is selected which results in the predetermined signal condition.

8 Claims, 12 Drawing Sheets

Fig. 1

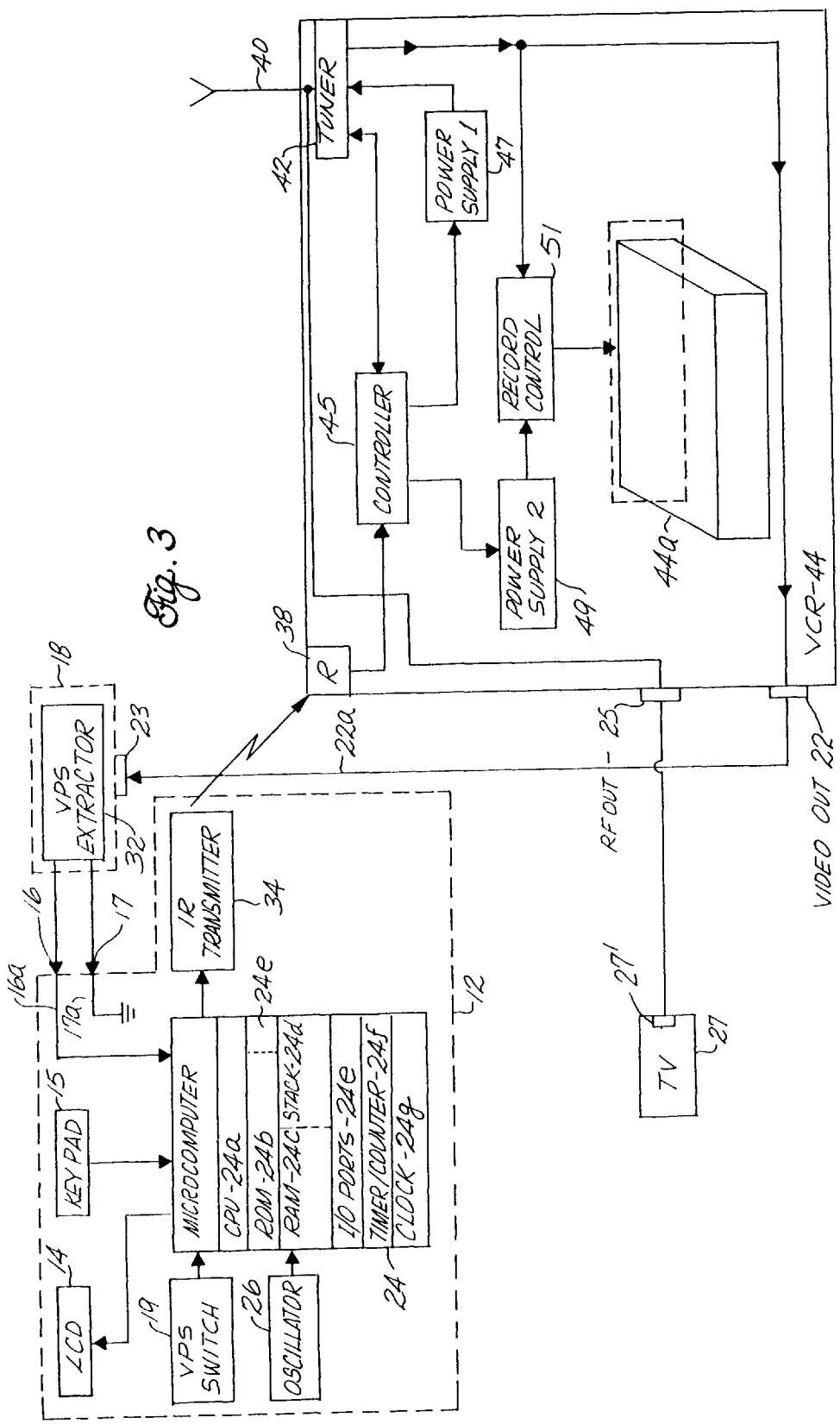

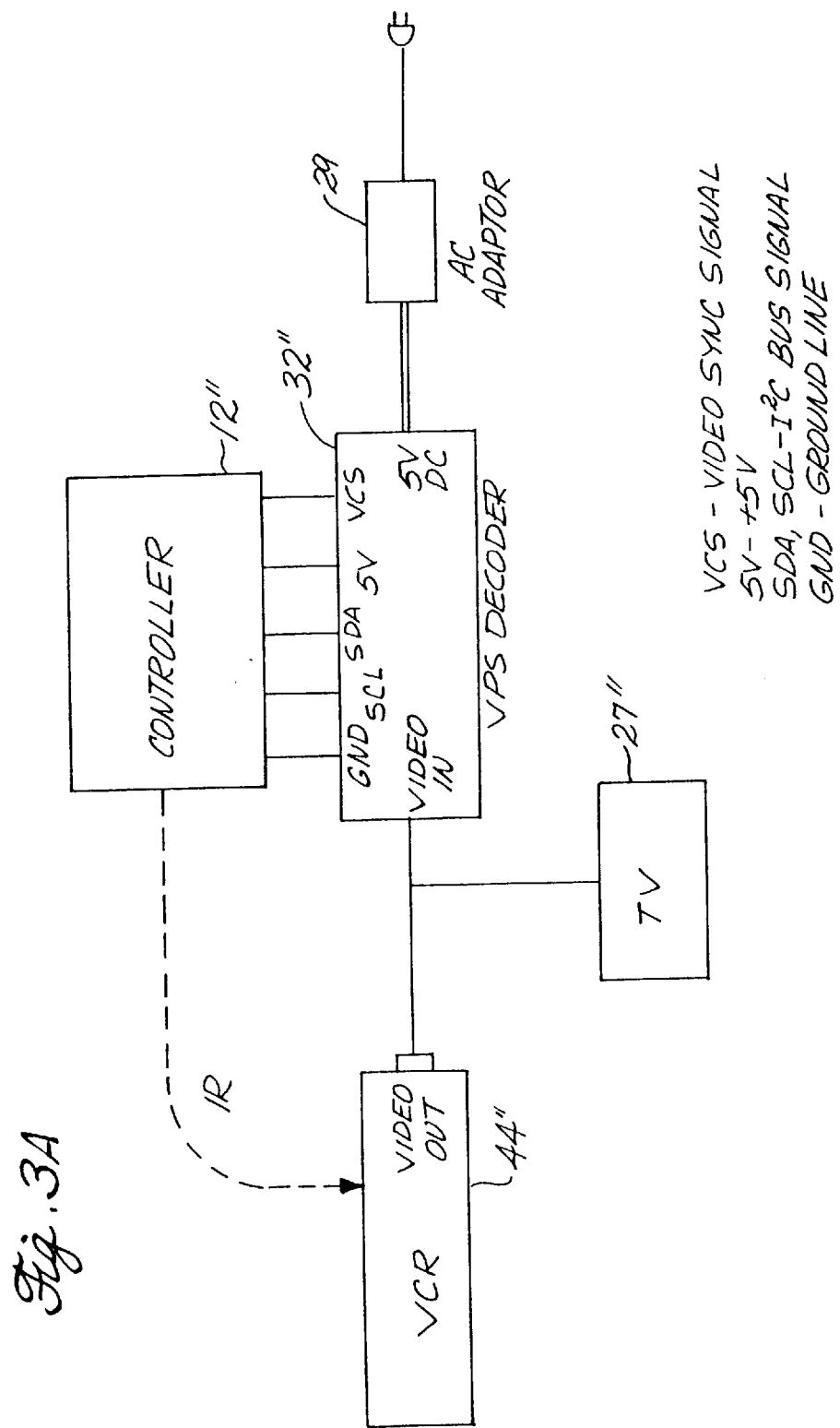

Fig. 6

| VPS CODE WORD NO. | 11 | | | | | | 12 | | | | | | 13 | | | | | | 14 | | | | | | |
|---|---|---|---|---|---|---|---|---|---|---|---|---|---|---|---|---|---|---|---|---|---|---|---|---|---|
| VPS BIT NO. | 0 1 | 2 3 4 5 6 | 7 8 9 10 11 | 12 13 14 15 16 | 17 18 19 20 21 | 22 23 24 25 | 26 27 28 29 30 31 |
| ADDRESS | DAY | MONTH | HOUR | MINUTE | COUNTRY | PROGRAM CHANNEL |

Fig. 9

TABLE-110

| NAME | G-CODE CHANNEL NO. | ACTUAL CHANNEL NO. |
|---|---|---|
| ABC | 7 | 10 |
| NBC | 4 | 39 |
| ⋮ | ⋮ | ⋮ |

VPS COMPATIBLE APPARATUS AND METHOD FOR SELECTION OF CORRECT IR CODE SETS

CROSS-REFERENCE TO RELATED APPLICATIONS

This is a continuation of patent application Ser. No. 08/440,191 filed May 12, 1995, now abandonded.

FIELD OF THE INVENTION

This invention relates generally to video cassette recorder systems and particularly to preprogramming of video cassette recorders (VCRs).

BACKGROUND OF THE INVENTION

The disclosure contained in each of U.S. Pat. No. 5,307,173 and International Application Publication No. WO 90/07844 (collectively the Prior Applications) is hereby incorporated by reference into the present application. The Prior Applications disclose apparatus and methods for using compressed codes called "G-CODEs" for timer preprogramming of VCRs. A commercial controller for programming VCRs using these codes is called the VCR PLUS+™ programmer and the compressed codes are commercially referred to as PlusCode™ both being trademarks of Gemstar Development Corporation who markets the programmer and codes. Briefly, the G-CODEs are used for simplifying and reducing the chances of errors in the preprogramming of VCRs. Each G-CODE consists of 1 to 8 digits and is associated with the channel, date, time and length of a future television program. A user looks up the G-CODE in a television program guide and enters the G-CODE in programmer instead of separately entering the program channel, date, start time, and length values. Each G-CODE is a result of encoding a set of individual program channel, date, start time, and length values. Each G-CODE is thus compressed in that it has a length that is shorter than the length of the concatenation of the individual program channel, date, start time, and length values.

The encoding of the C-CODEs is done prior to preparation of the television program guide that publishes the codes. For each program that is to be printed in the guide with a G-CODE, the channel, date, time, and length values for the G-CODE are entered in the computer. The computer uses a "priority vector" and a "bit hierarchy key" to assign a number 1 to 8 digits long (i.e., a number between 1 and 99,999,999) based on the statistical popularity of the channel, time and length of each program. Thus, the programs on the more popular channels broadcast at popular times and having common lengths are assigned fewer numbers of digits and programs on less popular channels at less popular times with less popular lengths are assigned higher numbers of digits in their respective G-CODEs. As a result, each G-CODE represent not only the program channel, date, start time, and length values, but also the probability that the program will be selected. Further, details of methods for encoding and decoding the G-CODEs are more fully explained in the Prior Applications.

One problem with using G-CODEs to preprogram a VCR controller is that the program start time and length values are predetermined in the G-CODEs and cannot be changed due to later schedule or transmission time changes. For example, if the actual transmission of a program is delayed or advanced, or if the length of a program changes (for example, when a sport game goes to overtime), a VCR controller preprogrammed with G-CODEs will not be able to record the desired program in full. The possibility of not recording the full program is reduced by allowing the user to manually key into the controller in an extension to the length represented by the G-CODE. However, this requires operator intervention and the extension may not be enough or the length might be too long overlapping with another program to be recorded.

Another system exists in Germany that is different from the above G-CODE approach. Television transmitters in Germany have adopted the Video Program System (VPS) guidelines. The first German Television (ARD) and the second German Television (ZDF) currently comply with the VPS guidelines. The detailed specification of the VPS is set forth in technical guidelines of the Public Broadcast Bureau in the Federal Republic of Germany, Guideline No. 8 R 2, Edition No. 2, 08/87, authored by the Technical Commission ARD/ZDF and published by the Institute for Broadcast Technology (IBT) content of which is hereby incorporated by reference into the present application.

According to the VPS, a user enters into a controller for a VCR information corresponding to a selected program, including individual program channel, date, predicted start time, and length values from information printed in a television program guide. The VCR's tuner is switched to the actual channel corresponding to the user-entered channel number on the program date, but at a time prior to the scheduled start time. For example, if the user selected a program by entering 2 as the channel number, and the 15th as the date, 7:30 p.m. as the start time, and 0.5 hours as the length, the VCR equipped with a VPS extractor would turn on the tuner at 4:30 p.m. on the 15th and switch the tuner to channel 2 (i.e., the tuner is turned on three hours ahead of the predicted start time). According to the VPS, each video program includes a VPS label or code transmitted in data line 16 of the vertical blanking interval (VBI). A VPS extractor or decoder is connected to the tuner. Coincidence between the start time entered by the user and the start time contained in a VPS code is looked for. Although the actual video program may be transmitted before or after the predicted start time, its VPS code always includes the predicted start time. Thus, the predicted start time information printed in a television program guide matches the start time included in the VPS code. The beginning of transmission of the user-selected program is signalled by the transmission for the first time of a VPS code whose start time equals the predicted start time. As soon as the user-entered start time and the start time included in the broadcast VPS code are identical, the VCR starts recording the program being transmitted. The end and/or the interruption of a program transmission will be signalled and recognized by a different start time in a different VPS code. Thus, the user-selected program is recorded from the very beginning to the very end regardless of shifts in the start time and changes in the length of the program.

Users of VCRs equipped with VPS extractors typically input separate channel, date, start time, and length values of the selected video program. This preprogramming procedure suffers from a number of drawbacks. First, the procedure can be complex and confusing and difficult to remember. Thus, many VCR owners avoid using the preprogramming feature. Second, user programming errors occur and as a result the recording of the channel, date, time, and length information to the VCR is often in error. Third, even for experienced users, the process of entering a lengthy sequence of information on the channel, date, time, and length of a desired program can be tedious.

Thus, there is a need in the art for a system for simplifying VCR preprogramming using program labels or codes broadcast with or in the program to be recorded in which users select programs to be recorded using compressed codes representing channel, time, and length values.

Methods and apparatus are known which allow a user of a built-in or remote controller to select the proper IR codes for controlling a consumer electronic device. By way of example, one device known as the VCR PLUS+ Programmer, distributed in the United States by Gemstar Development Corporation, has a stored set of IR codes, one of which is selected for controlling each particular type of VCR. The various control functions which each set of IR codes may control include turning on the VCR, turning off the VCR, tuning the tuner in the VCR to the correct channel, turning on the drive to the tape cassette and causing a program on the tuned channel to be recorded and turning off the VCR after a program has bene recorded.

In that device, the VCR to be controlled is set to channel 3 and then is turned off. The brand of VCR is located and a number corresponding to that brand is then entered on a keyboard of the controller. The controller is then pointed at the VCR and an "enter" button is pressed. The controller then selects a corresponding set of IR codes and, from that set of IR codes, selects codes which cause the VCR to turn on and IR codes that cause the tuner to switch to channel 9 and transmits IR signals derived from those codes to the VCR. If the VCR is turned on and changed to channel 9, then the user presses a "save" button which then selects the corresponding set of IR codes for future communication with the VCR. If the VCR does not turn on or turns on but is not changed to channel 9, then the controller is again pointed at the VCR and the "enter" button is pressed causing the controller to then select another set of IR codes and repeat the operation discussed above using this new set of selected IR codes. This is repeated until the VCR properly turns on and switches to channel 9, at which time the "save" button on the controller is pressed causing the corresponding set of IR codes to be selected for subsequent communication with the VCR.

Another problem with using G-CODES relates to mapping between channel numbers represented by G-CODES and the actual channels on which a desired program is broadcast. Each G-CODE corresponds to a specific G-CODE channel number. However, the channel number for the channel on which a user-selected program is transmitted depends on the cable company or the geographic area of the local transmitter. For example, a FOX program is received on channel 11 in Los Angeles as opposed to channel 6 in San Diego. Likewise, ABC and NBC programs are received on channel 7 and 4, respectively, Los Angeles as opposed to channels 10 and 39, respectively, in San Diego. Thus, although a program broadcasted on ABC has a single G-CODE listed in the television program guide, the program itself is received on two channels with different numbers in Los Angeles and San Diego. In many European countries this problem is amplified because typical television transmitters in Europe transmit at much lower power than television transmitters in the United States. Thus, the "network," such as ZDF, may be broadcast on several different channels in different areas within a single city causing potential overlap of signals with the same channel numbers.

To address this problem, the VCR PLUS+ programmer includes a channel map so that the user-entered G-CODE is decoded and the proper channel number is used to select the proper actual channel on which the user-selected program is received. Channel maps for converting a channel name or a channel number known to a user to the proper actual channel are generally known in the art. Typically they are created manually and stored in a correlation memory table or a re-down loaded from a local remote site into a memory table. A need exists for an efficient and accurate way to create a channel map automatically.

SUMMARY OF THE INVENTION

An embodiment of the present invention is a method for programming a controller for selection, from a plurality of infra red (IR) codes, a set of IR codes for subsequent control of IR signal communication with a video cassette recorder (VCR). Each set of IR codes is for communicating with a different corresponding VCR. To this end, each such VCR has a tuner, which, when tuned to an actual channel of broadcast video signals, provides video signals derived from the actual channel to a video output thereof. A signal is provided to the VCR where the signal is predetermined by a selected IR code which is selected from one of the sets of IR codes. This causes the VCR to perform a predetermined operation. The video output of the VCR is monitored for a predetermined signal condition, such as a video signal being present, or for a label broadcast in the video signals. A set of IR codes is then selected for subsequent signal communication with the VCR. The set of IR codes which is selected is the one from which the selected IR code is selected which results in the predetermined signal condition. With this arrangement, it is possible to automatically determine the proper set of IR codes for communication between a VCR controller and any of a number of VCRs automatically with virtually no user intervention.

BRIEF DESCRIPTION OF THE DRAWINGS

FIG. 1 is a front perspective view of a controller for inputting G-CODEs and receiving video programs with associated VPS codes for activating and deactivating a VCR and embodies the present invention;

FIG. 3 is a schematic and block diagram of a system including the controller of FIG. 1 and a VCR;

FIG. 3a is a schematic and block diagram illustrating the electrical inter-connection and signal coupling between a VCR, a TV, a controller and a VPS decoder chip, and embodies the present invention;

FIG. 6 depicts words 11–14 of the broadcast VPS code containing the channel, date, and start time values used by the various embodiments of the invention;

FIG. 9 depicts a channel correlation table used for channel mapping with the controller of FIG. 1 and the system of FIG. 7;

DETAILED DESCRIPTION

Figure 1:
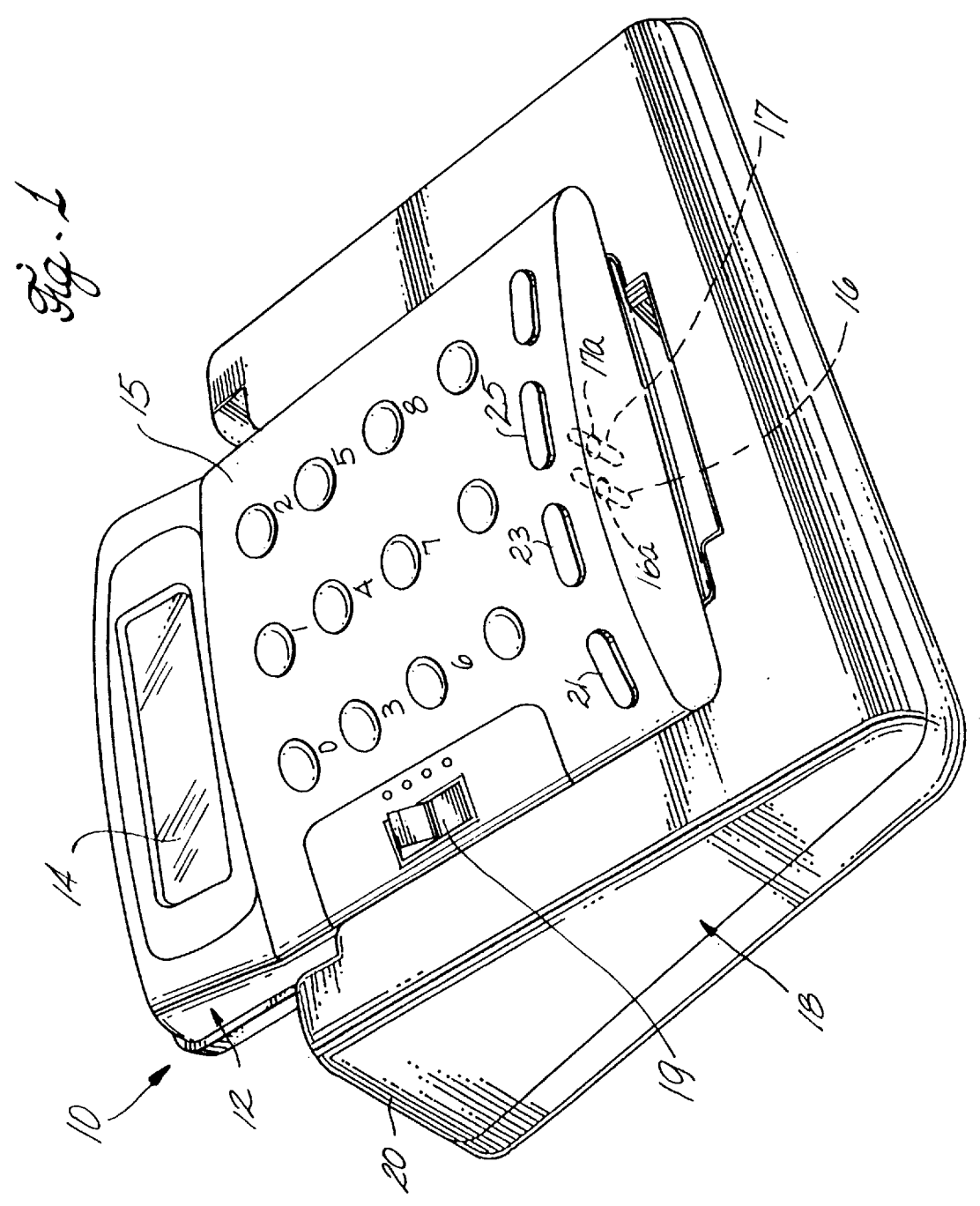
Figure 2:
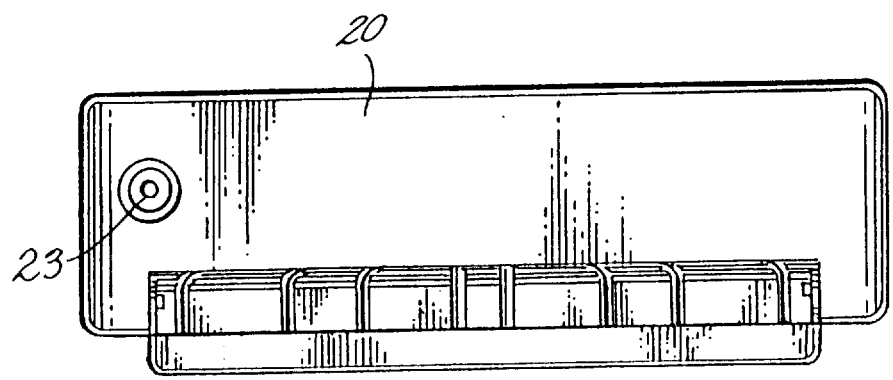
FIG. 2 is a rear view of the controller shown in FIG. 1.

FIG. 1 depicts a remote control or programmer 10 including hand-held unit or controller 12 mounted on base unit 18. Electrical pins 16 and 17 in base unit 18 provide removable electrical connections to contacts 16a and 17a, respectively, in hand-held unit 12 for signal communication. Pin 17 is connected to a common ground in the controller and the base unit. Key pad 15 forms an inputting means to enter the G-CODEs corresponding to user selected programs. Display 14 is a conventional liquid crystal display used for displaying and verifying user inputs and communicating messages from a microcomputer (see FIG. 3) to the user. The rear 20 of base unit 18, shown in FIG. 2, has an RCA-type jack 23 which forms means for receiving broadcasted programs from the "VIDEO OUT" of a conventional VCR.

The VCR is a conventional VCR in which the VIDEO OUT (video output) 22 is a conventional RCA-type jack connected to tuner 42 of the VCR and RF OUT 25 is a jack connected directly to the video or antenna input to the VCR going to the tuner 42. In this manner broadcast video signals input to the VCR are always passed from the input of the VCR to RF OUT 25 to TV 27 whether or not the VCR and tuner are turned on and video signals from the actual channel selected by tuner 42 from the input video signals are passed to VIDEO OUT 22 and from there over cable 22a to base unit 18 of remote control 10 when the tuner is turned on.

FIG. 3 is a schematic and block diagram illustrating the details of a system including the hand-held unit 12 and base unit 18, and a conventional VCR 44, the latter forming a recorder. Hand-held unit 12, keypad 15 for inputting compressed codes, LCD 14, and VPS switch 19 of FIG. 1 are depicted. Oscillator 26 provides regular reoccurring sinusoidal waves for generation of clock signals (not shown) used by microcomputer 24. Microcomputer 24 includes a central processing unit (CPU) 24a, read only memory (ROM) 24b, random access memory (RAM) 24c, stack memory 24d in the RAM, I/O ports 24e, timer/counter 24f and time of day clock generator 24g. Time of day clock generator 24g is preferably a programmed clock in the microcomputer to provide the time of day signals required to decode the G-CODEs and to turn on and turn off the VCR at the correct time. In a preferred embodiment microcomputer 24 is a NEC 7530 μPDx microcomputer which can interface directly with LCD 14, keypad 15, VPS switch 19, oscillator 26, and IR transmitter 34. Infra red (IR) transmitter 34 is driven by microcomputer 24 and transmits IR codes, represented by the signals from microcomputer 24, to VCR 44. IR transmitter 34 includes, by way of example, Litton 2871C IR diodes.

Referring to base unit 18, VPS extractor 32 detects, extracts and decodes the VPS codes or program information labels, from the television signals for programs received by VCR 44, and transmits the decoded VPS codes in digital form to microcomputer 24 through pins 16 and 17 (FIG. 1). VPS extractor 32 is preferably an integrated circuit chip and is, by way of example, a Seimens SAA 4700 VPS extractor.

VCR 44 is a conventional video cassette recorder that is controlled by IR signals for recording on a tape cassette 44a broadcasted video signals received through antenna 40. The TV signals for the video programs are received and selected by tuner 42 and are transmitted to VPS extractor 32 over cable 22a through VIDEO OUT 22. IR receiver 38 receives IR signals from hand-held unit 12. Controller 45 receives control signals or commands from microcomputer 24 through IR receiver 38. Controller 45 enables power from supplies 47 and 49 to tuner 42 and record control 51, respectively. Controller 45 also switches the frequency or channel of TV signals selected and provided by tuner 42. Record control 51 starts and stops recording the programs received by tuner 42 when power from power supply 49 is respectively enabled and disabled.

Figure 4:
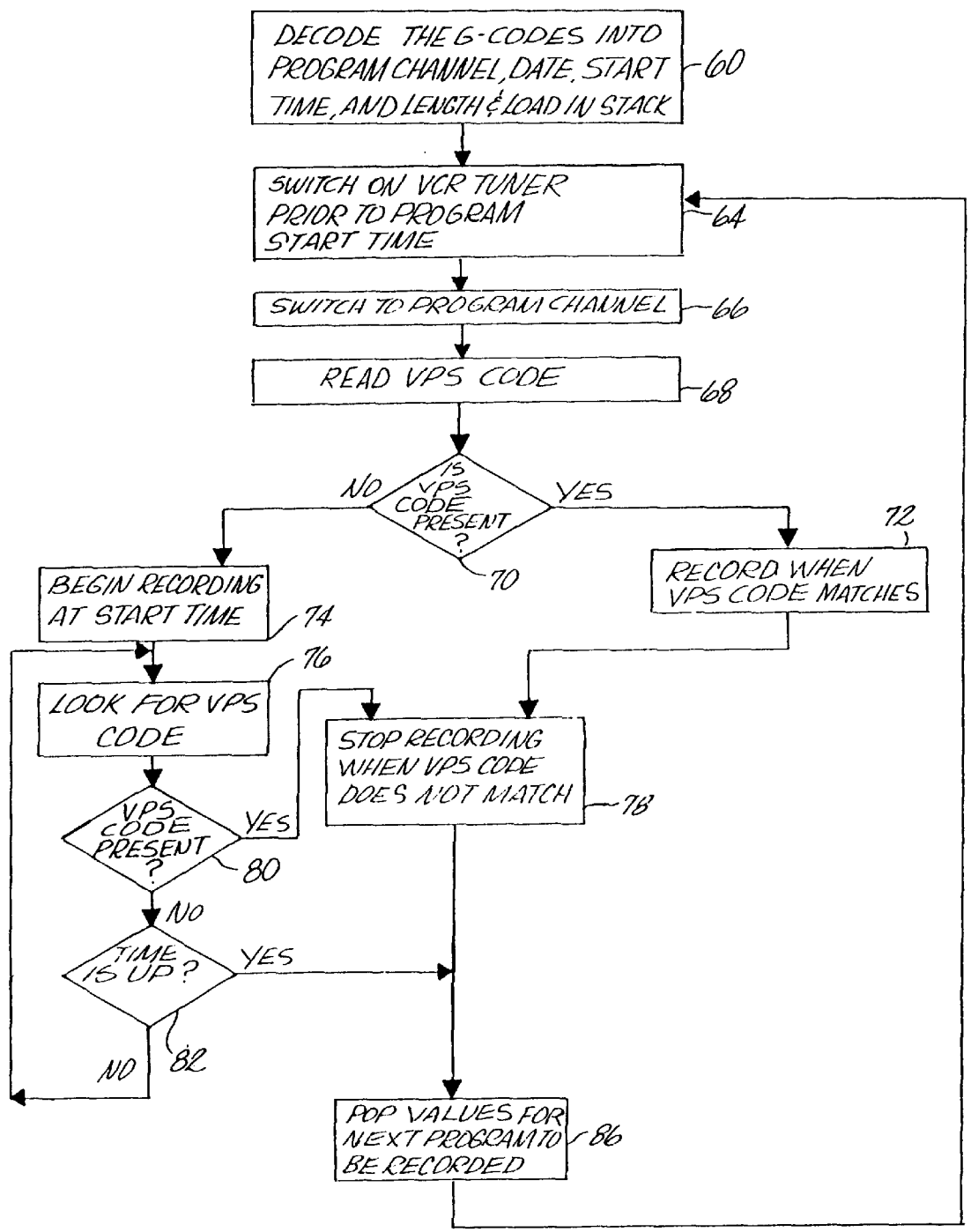
FIG. 4 is a flow diagram illustrating operation of the controller in FIG. 1.

Consider the operation of remote control 10 with reference to FIGS. 1, 3 and 4 and the following examples. The user begins by looking up, in a television program guide, the G-CODE (not shown) corresponding to a selected program and proceeds by serially entering the decimal digits of the G-CODE into hand-held unit 12 using keys 0 through 9 followed by pushing entry key 21 of alphanumeric keypad 15. The user may repeat this process for each G-CODE corresponding to each additional selected program.

As soon as each desired G-CODE is entered by pressing the entry key, the code is decoded and expanded by microcomputer 24 into individual program channel, date, start time, and length values according to a decoding program stored in ROM 24b of microcomputer 24 (step 60). The decoding process is the reverse of the encoding process discussed above. Both the decoding and encoding processes are explained in detail in the Prior Applications.

Assume that the user enters "1138" as the G-CODE corresponding to a first selected program and a second G-CODE "265" corresponding to a second selected program. These G-CODEs are stored in RAM 24c of microcomputer 24 as soon as they are entered by the user. By executing the decoding program stored in ROM 24b, CPU 24a of microcomputer 24 determines the individual channel, date, start time, and length values corresponding to each of these codes. For example, the G-CODE 1138 corresponds to a program that is scheduled to be broadcasted on channel 4, on the 15th of a particular month, at 7:30 pm, and with a length of 30 minutes. G-CODE 265 corresponds to a program that is scheduled to be broadcasted on channel 7, on the 15th of the month, at 6:30 pm, and with a length of 30 minutes. Microcomputer 24 stores the decoded channel, date, start time, and length values of the user-selected programs for each G-CODE in a separate memory location of stack 24d of RAM 24c. The program values corresponding to the G-CODEs are arranged from top to bottom of the stack 24d one after the other in order of the decoded start times, going from the earliest to the latest date and start time. The program values for the G-CODE with the earliest date and start time are always at the top of the stack.

Using the values for the program at the top of the stack, microcomputer 24 turns on tuner 42 a predetermined amount of time, such as three hours, but preferably at least 5 minutes, prior to the time indicated by the start time value to ensure that programs that are advanced in transmission time are properly recorded (step 64). Microcomputer 24 accomplishes this by commanding IR transmitter 34 to transmit power on IR signals to IR receiver 38 of VCR 44. Controller 45 receives the signals from IR receiver 38 and enables or applies power from supply 47 to tuner 42 turning on the VCR. Referring to the example, for the case of the G-CODE 265, microcomputer 24 enables power to tuner 42 on the 15th at 6:25 pm. Thereafter, microcomputer 24 commands IR transmitter 34 to transmit channel select IR signals to VCR 44 corresponding to the channel value in the top of the stack causing controller 45 to switch tuner 42 to channel 7 (step 66). At this point, the VCR is tuned to program channel 7 five minutes prior to transmission of the user-selected program and is providing the television signals for channel 7 to VPS extractor 32.

Figure 5:
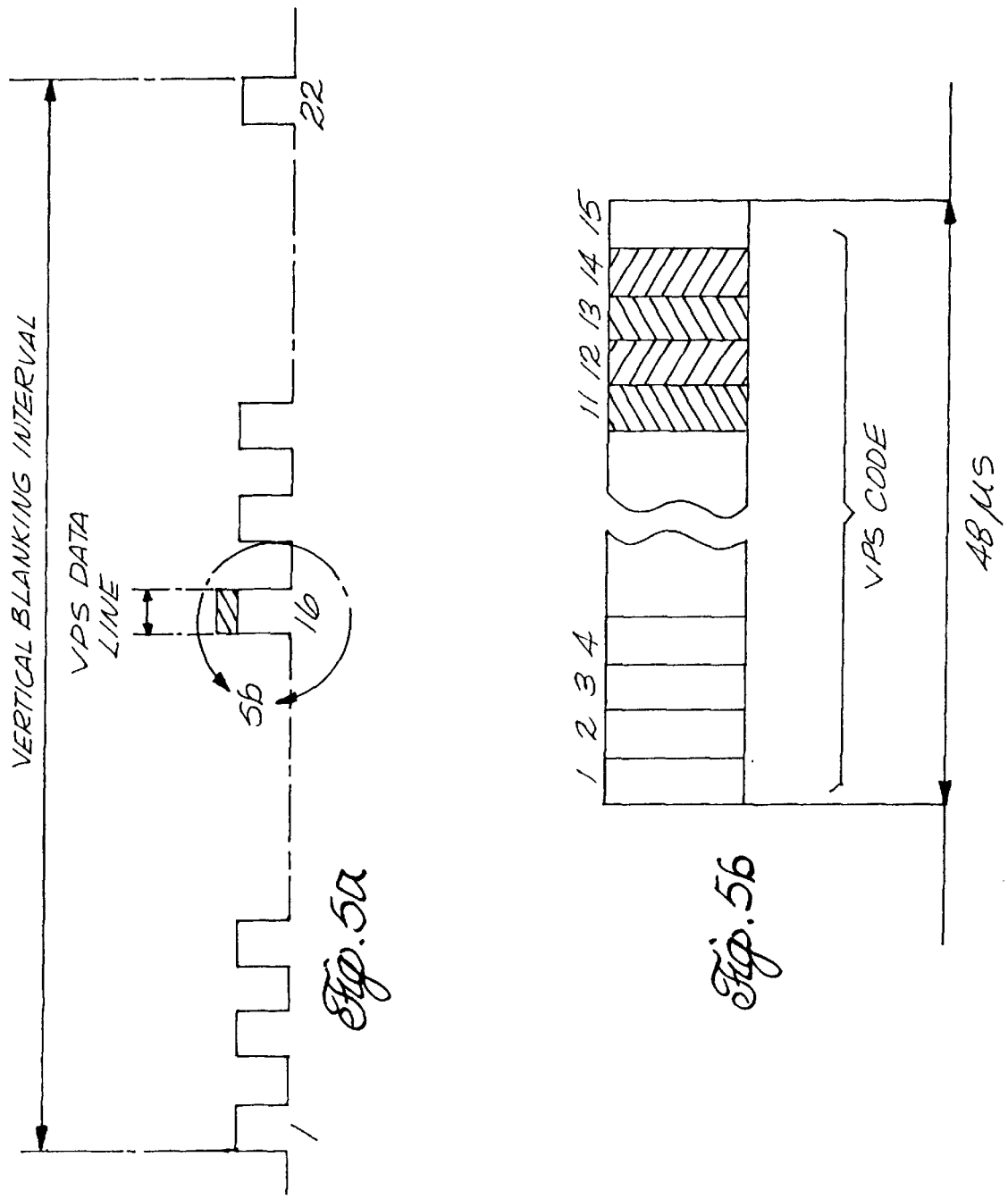
FIGS. 5a and 5b depict the format of the VPS code broadcast during the vertical blanking interval of television signals.

VPS extractor 32 receives and separates the program information labels or VPS signals in the vertical blanking interval of the television signals depicted in FIGS. 5a and 5b, decodes them into digital form compatible for microcomputer 24. The decoded signals are coupled over pins 16 and 17 directly or through individual buffer circuits (not shown) to the I/O ports 24e to the microcomputer 24 (step 68).

Fourteen words make up the decoded VPS code as depicted by the VPS word format of FIG. 5b. Words 11–14 comprise 32 bits of data. These 32 bits are shown in FIG. 6 and are arranged as follows. Bits 2 to 6 identify the scheduled transmission day for the video program, bits 7 to 10 identify the scheduled transmission month, bits 11 to 15 identify the scheduled transmission hour, bits 16 to 21 identify the scheduled transmission minute, bits 22 to 25. identify the scheduled transmission geographic area (for example, the state or country to which the program is transmitted), and bits 26 to 31 identify the channel name on which the program is transmitted. Thus, in accordance with the VPS, six groups of data, represented in bits 0 to 31 of words 11 to 14 in the VPS code, contain the program channel, date, and start time information.

These 32 bits of data are continually transmitted in each VPS code. Microcomputer 24 isolates bits 2–6, 7–10, 11–15, 16–21, and 26–31 which respectively identify the scheduled transmission day, month, hour, minute, and channel name. VPS switch 19 when set (step 70), causes microcomputer 24 to continuously compare, for equality (i.e., a predetermined relation) the start time indicated by bits 11–21 and the start time of the program values at the top of the stack, which in the example is 6:30 p.m. Thus, microcomputer 24 transmits a command via IR transmitter 34 to VCR 44 causing record control 51 to enable power to a drive (not shown) for tape cassette 44a and enable or begin recording the program on tape cassette 44a. This occurs as soon as the start time indicated by the decoded VPS code matches or equals the start time value at the top of the stack 24d ( step 72 ). The broadcast signals in the channel selected by tuner 42 are then recorded using a record head and circuitry not shown but well known in the art.

The same VPS code identifying the same start time is transmitted in the vertical blanking interval of the broadcast program until the program is over. When the program is over the next program includes a new VPS code with a different start time. When the VPS start time changes, microcomputer 24 recognizes the new start time by detecting the difference from the start time value at the top of stack 24d and enables or commands VCR 44 via IR transmitter 34 to disable or stop recording (step 78). As a result controller 45 causes power to be removed from tuner 42 and 49 from the drive for tape cassette 44a, thus terminating recording in cassette 44a. Therefore, if the program being recorded is extended beyond the scheduled program length, for example in the case of an overtime in a sport game, the start time contained in the VPS code for that program will continue to match the start time indicated by the G-CODE until the program ends and as such the program will be recorded in its entirety.

When the recording of a program ends (step 78), microcomputer 24 pops up to the top of the stack, the decoded values in the location next to the top of the stack with the G-CODE having the next earlier start time (step 86) and the recording process is repeated in the manner explained above for the program values at the top of the stack (steps 64 at sequence).

If the user decides to start recording a selected program solely based on the start time included in the GCODE, VPS switch 19 is not set by the user (step 70). In that case microcomputer 24 will send IR signals to activate VCR 44 to begin recording precisely at the start time represented by the start time value at the top of the stack regardless of the start time indicated by the VPS code (step 74). To this end, controller 45 enables power to the drive for the tape cassette 44a, causing the program with the start time at the top of the stack to be recorded. However, microcomputer 24 will continually check and compare the start time in each VPS code received from VPS extractor 32 (step 76) with the start time in the values at the top of the stack so that when a VPS code is present (step 80) whose start time does not match the start time value at the top of the stack, microcomputer 24 will command controller 45 to stop recording as is discussed above (step 78). If microcomputer 24 never receives a VPS code with a matching start time (step 80), microcomputer 24 will command controller 45 in VCR 44 to stop recording after an elapsed time equal to the program length value at the top of the stack (steps 82 and 88) following which the stack is popped up and step 64 is repeated. Thus, the system will work even if VPS codes are not present.

Figure 7:
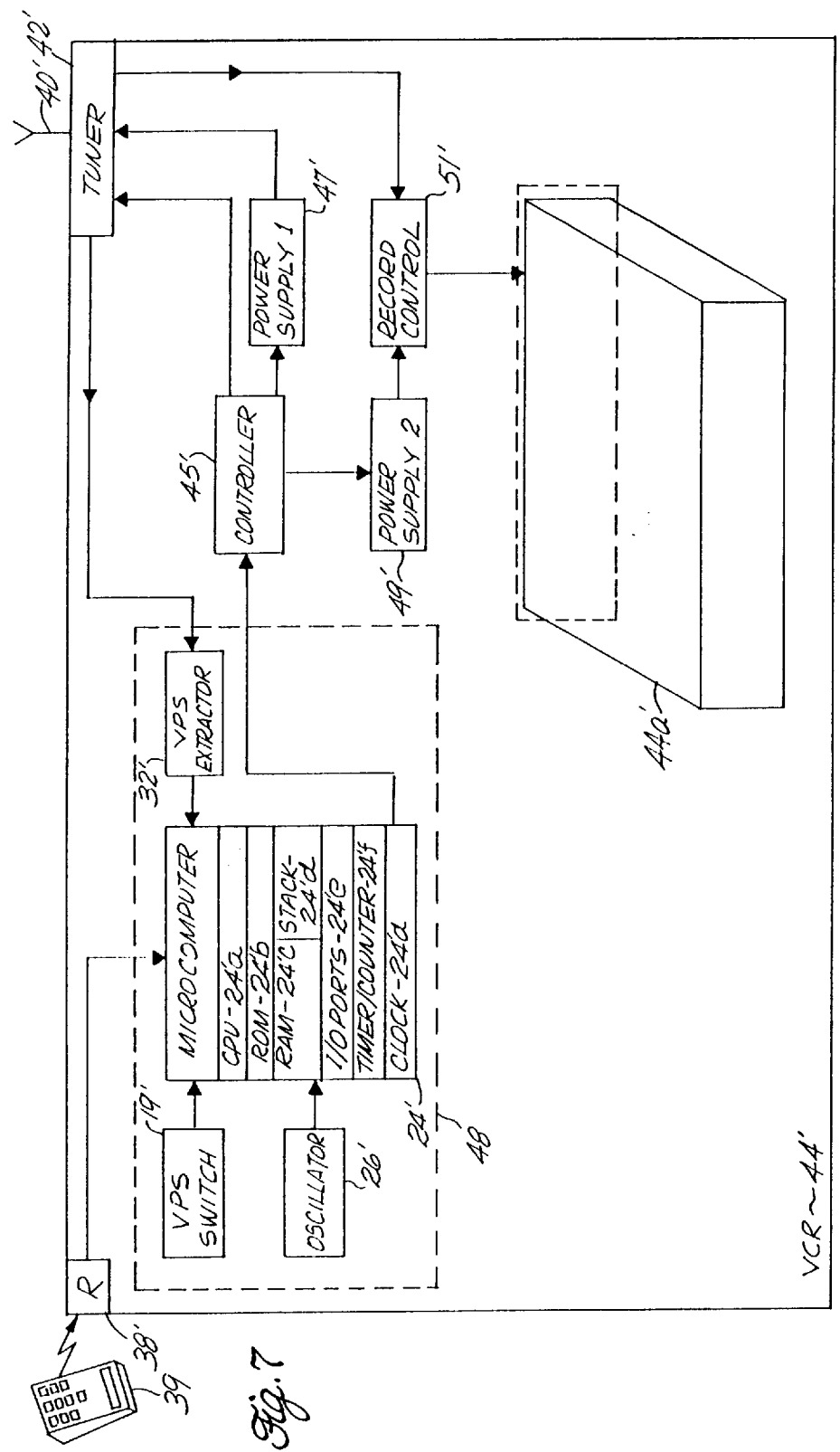
FIG. 7 is a schematic and block diagram of another embodiment of the invention in which the controller is contained within a VCR.

Another embodiment of the invention is shown in FIG. 7. In FIG. 7, remote control 10 is replaced by a conventional VCR remote control 39 except that it is capable of transmitting the G-CODE via IR signals to the VCR for decoding and expanding to individual channel, date, start time, and length values and for storage in a stack. Remote control 39 simply transmits user-entered information via IR signals to VCR 44' from a remote location. All of the components of remote control 10 of FIG. 1, with the exception of IR transmitter 34, keypad 15, and display 14 are embedded in VCR 44'. Thus, VPS extractor 32', VPS switch 19', oscillator 26', and microcomputer 24' are all housed within VCR 44'. This embodiment of the invention uses essentially the same elements operating in essentially the same way as described for and depicted in FIGS. 1–3 and illustrate similar elements by the same reference numerals with a prime in FIG. 7. The functions performed by remote control 10 are now performed by G-CODE compatible VPS decoder 48' located in the VCR.

Although in describing the above embodiments of the invention references were made to "broadcast" programs, this term is used to include programs transmitted through cables or over the air from satellite or a local TV station. As such, tuner 42 may receive video signals having VPS codes through a satellite receiver or a cable box as well as antenna 40. Further, tuner 42 may be included inside the cable box or the satellite receiver instead of VCR 44. Further, in the embodiment of the invention shown in FIG. 3, VPS extractor 32 may be housed inside VCR 44 in which case microcomputer 24 receives the extracted VPS codes directly or via IR codes from an output of VCR 44. Further, VPS extractor 32 can be designed to extract codes such as VPS transmitted not only in the vertical blanking interval but also in the video picture portion of television programs. Moreover, a teletext decoder such as a Seimens SDA 5231 can be used instead of the VPS extractor in order to extract program related codes transmitted in teletext form. In another embodiment, the invention is adapted to recording audio programs (with no accompanying video program) which are transmitted with codes identifying their respective program start times. Thus, the various embodiments of the invention are adaptable for use in any audio or video programming system where transmitters transmit a program information label including a program start time along with the program being transmitted.

Other arrangements are possible. For example, a delay of the TV program indicated by the values in the top of the stack may cause the program corresponding to the values in the next location of the stack to occur first. In one embodiment of the invention, the microcomputer will cause the tuner of the VCR to turn on as discussed above and scan the extracted VPS labels for a start time matching the start time value for either of the top two locations of the stack. This would, by way of example, be done by causing the microcomputer to alternatively switch the VCR tuner back and forth between channels for the channel values in the top two locations of the stack and scan for the VPS label with a start time matching the start time value in either of the top two locations of the stack in each of successive five minute intervals or more often. If a match is found between the start time of a VPS label and the start time value in the top of the stack, then the microprocessor, as discussed above, causes recording and termination of recording of the program broadcast in the channel specified by the channel value in the top of the stack. If on the other hand, a match is formed between the start time of a VPS label and the start time in the location next to the top of the stack, then the microprocessor will cause the value in the location next to the top of the stack to be popped up to the top of the stack and, as discussed above, used for recording and termination of recording of the program from the channel specified in the channel value moved to the top of the stack.

Alternatively, the microcomputer causes the VCR tuner to switch on a predetermined amount of time before the time indicated by the start time value at the top of the stack, select the channel corresponding to the channel value at the top of the stack and monitor the TV signals from the selected channel. If the VPS label with a matching start time is not found, the VCR tuner is turned off and the scanning is terminated after a predetermined amount of time, i.e., three hours after the time indicated by the start time in the top of the stack. The scanning for the program indicated at the top of the stack could also be terminated five minutes before the start time value for the next location in the stack and the stacks would then be popped up. The microcomputer then causes the VCR tuner to select the actual channel corresponding to the channel value now in the top of the stack. The microprocessor then starts scanning VPS labels for one with a start time matching the start time value in the top of the stack and causes the VCR to start recording when that VPS label is located. In this manner, the program for prior value in the top of the stack is skipped.

Other methods and arrangements are possible for comparing information carried in the G-CODEs and the VPS codes. Thus, one or more additional values derived from the G-CODEs could be compared with corresponding values from the VPS code.

CHANNEL MAPPING

Figure 8:
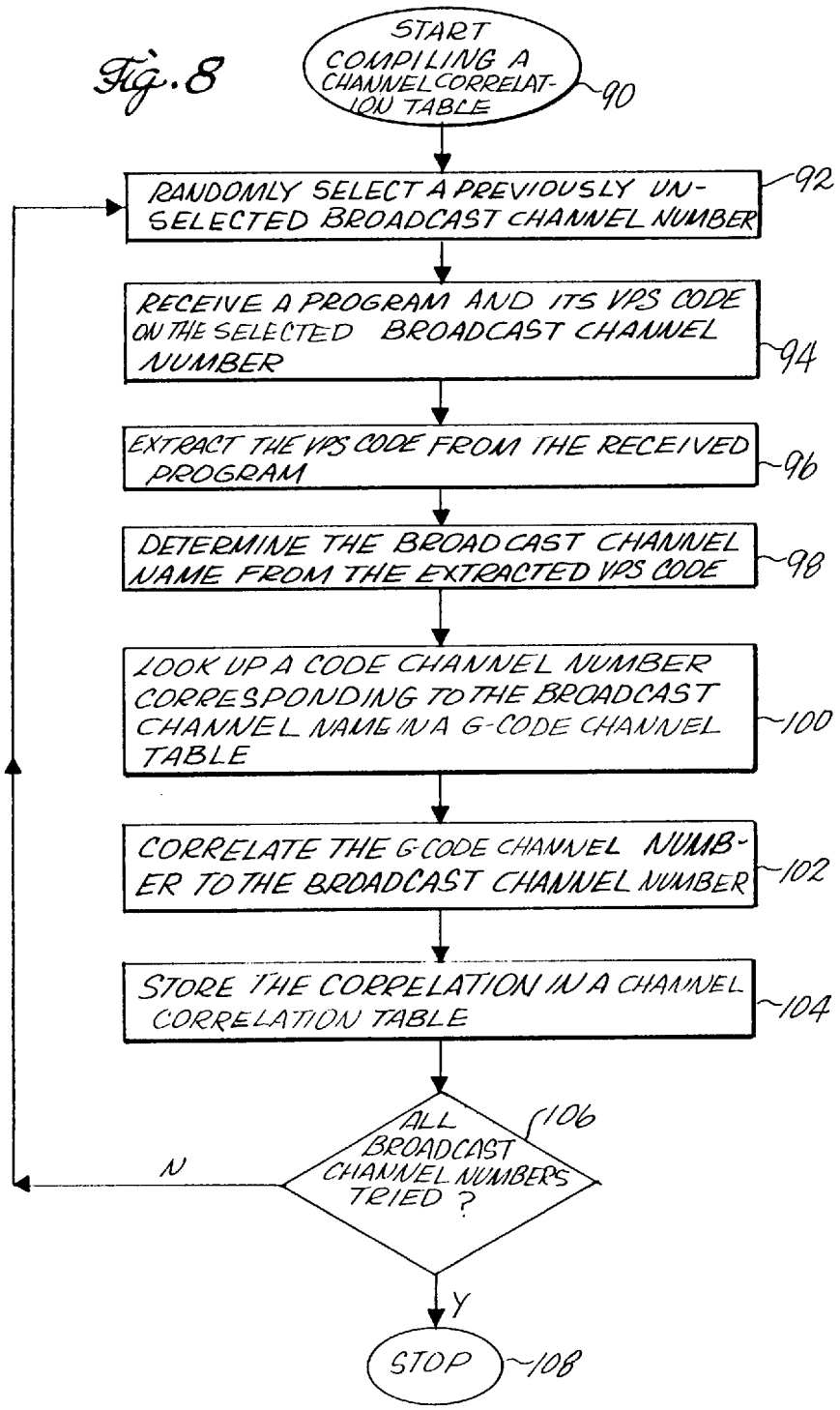
FIG. 8 is a flow diagram illustrating a method embodying the invention for compiling a channel correlation table for channel mapping.

FIGS. 1–3 in conjunction with FIG. 8 illustrate another embodiment of the invention for channel mapping. In this embodiment, the VPS codes received by remote control 10 are used to create a channel map or correlation Table 110 in RAM 24c which is used for selection of the proper actual channels using the channel number values from the compressed G-CODEs. If a station, i.e., ABC, transmits VPS codes as a part of its video signals, the broadcast channel name, i.e., ABC, will be indicated by bits 26–31. The extracted broadcast channel names, i.e,. ABC, can be used to compile a channel correlation table for proper channel mapping or set up of remote control 10 as explained below.

Hand-held controller 12 is adapted for channel mapping creating the correlation Table 110 in RAM 24c and for causing the correct actual channel number (and channel) to be selected for a given channel name and G-CODE channel number using a correlation Table 110.

To this end, the channel number for each G-CODE is initially assigned the name of the desired program as depicted in the columns labeled "NAME" and "G-CODE Channel No" by pre-storing them in the Table 110 of RAM 24c depicted in FIG. 9. Each channel name, such as ABC, may correspond to one actual frequency or channel number in one geographical area or in one cable system, but a different frequency and channel number in a different geographical area or in a different cable system. Hand-held controller 12 is arranged to automatically complete or create a correlation between each G-CODE channel number and complete table 110 in RAM 24c by determining and storing the actual channel number in the row for the correspondence G-CODE channel number.

FIG. 8 is a flow chart depicting the operation of the hand-held unit 12 for automatically creating the correlation Table 110. The hand-held unit 12 is inserted in base unit 18 and video button 23 is pressed. Microcomputer 24 then begins by randomly selecting an actual channel number, such as channel 10 (step 92), and sends a signal to the VCR causing tuner 42 to switch to the corresponding actual channel or frequency of TV signals (step 92). Microcomputer 24 then receives the decoded VPS codes from the selected channel of TV signals (steps 94, 96) and isolates bits 26–31 containing the broadcast channel name. Microcomputer 24 compares the name from the extracted VPS code with the names in the table (steps 98 and 100) and when equality is detected with one of the names, stores the actual channel number in the corresponding row of Table 110 (steps 100 and 102) in association with the corresponding G-CODE channel number. This operation is repeated by pressing the video button again selecting a different actual channel number and channel of TV signal until all desired rows of Table 110 are filled in with an actual channel number (steps 94, 96 and 98). For example, ABC, G-CODE channel 7, is assigned actual channel number 10 and NBC, G-CODE channel 4, is assigned actual channel number 39. Only a few of the rows of Table 110 are shown in FIG. 9 by way of example, but it is understood that additional rows for all desired G-CODE channel number values and actual channels will be completed in the manner discussed above.

The correlation Table 110 depicted in FIG. 9 is then used by the microcomputer in the hand-held controller for selecting the proper actual channels during subsequent operation. To this end, each time the channel number value for a G-CODE is used to select a program for recording, as discussed above, the G-CODE channel value in Table 110 contained in RAM 24c is inspected to select the corresponding actual channel number in the same row. The selected actual channel number is then sent to the VCR causing the program broadcast over the corresponding actual channel to be selected and recorded as discussed above. By way of example, G-CODE channel values 7 and 4 would cause programs for actual channel numbers 10 and 39 to be selected for recording in VCR 44.

The channel correlation table described above can be compiled using other embodiments of the invention, such as the embodiment shown in FIG. 7, or the embodiment in which the broadcast channel name is extracted by a teletext decoder.

IR CODE SELECTION

The hand-held controller 12 also automatically determines the proper protocol required for communication with the type of VCR with which it is communicating. Each type of VCR has its own corresponding set of pre-stored protocols to allow proper communication via IR signals.

To this end, ROM 24b of the hand-held controller in FIG. 3 has a memory Table 24e where a set of IR codes are stored for determining the timing, sequence and coding of signals to be sent to each type of VCR for turning on the VCR, selecting the proper channel in the tuner of the VCR, causing the VCR to start driving the tape cassette for recording and to cause the drive and recording to terminate. One set of protocols is stored for each different VCR or other device with which the hand-held controller may communicate. The correct set of protocols for the particular VCR are found in the table and once selected, are used for subsequent communication using IR signals.

The hand-held controller in cooperation with base unit 18 are arranged using the standard VIDEO OUT or video output connector 22 provided in most VCRs to automatically determine when the correct set of protocols for the VCR have been located.

Figure 10:
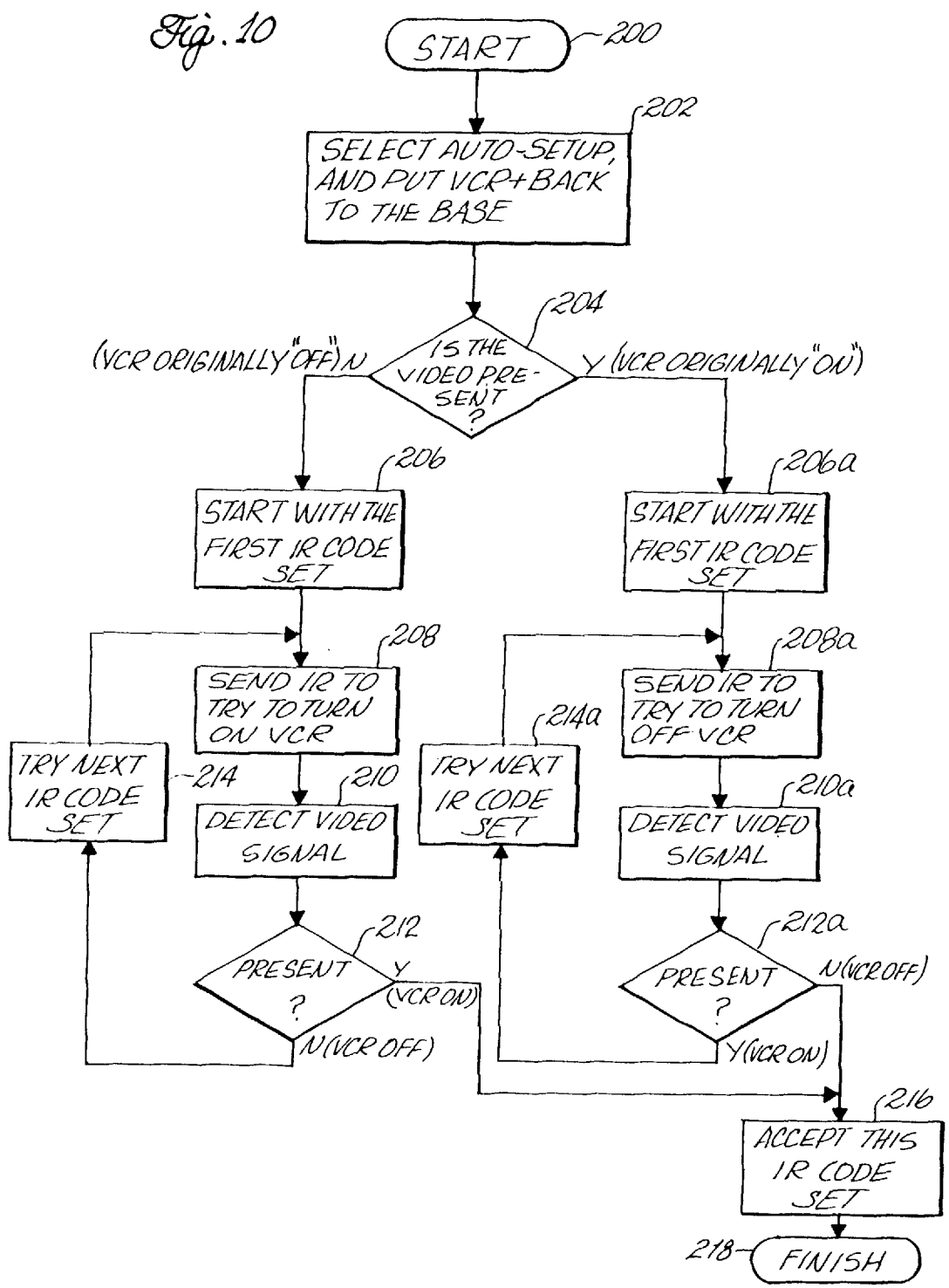
FIG. 10 is a flow diagram illustrating the operation of the systems of FIG. 3 for automatic selection of IR codes for the VCR.

FIG. 10 is a flow diagram illustrating the sequence of operation of the hand-held controller and base unit of FIG. 3 for automatically determining and selecting the proper set of IR codes stored in Table 24e. Initially, the hand-held controller 12 is inserted into base 18 and the enter button 25 on the keyboard is pressed to cause the automatic set up operation to start at blocks 200 and 202 of the flow. During block 204 the hand-held controller and base unit 18 determine whether a video signal is present on cable 22a from VIDEO OUT connector 22.

The presence of video signals on the VIDEO OUT connector 22 is detected as follows. If during the operation in block 204 the microprocessor detects that a video signal is not present from VIDEO OUT connector 22, it is known that the VCR is initially turned off, and the block 206 is entered where a coded signal is obtained from one of the sets of IR codes in Table 24e telling how to turn the corresponding VCR on for that set of IR codes. During block 208 the appropriate VCR turn on IR signals are transmitted via transmitter 34 to VCR 44. During block 210 the microcomputer 24 determines whether a video signal at VIDEO OUT connector 22 is present. If a video signal is present then it is known that the correct set of IR codes for the VCR have been located and blocks 212 and 216 are entered where a corresponding set of IR codes are selected for subsequent control of the VCR, as discussed above, and the operation is terminated at block 218. If during block 210 the microcomputer 24 does not detect that a video signal is present from VIDEO OUT connector 22, then blocks 212 and 214 are entered where another one of the sets of IR codes for another VCR is selected and block 208 is reentered where the turn on signals for the newly selected set of IR codes are transmitted in an endeavor to turn on the VCR in the same manner discussed above. The operation of blocks 208–214 are repeated until the microcomputer detects a video signal from the VIDEO OUT connector 22 in which case blocks 212, 216 and 218 are entered from block 212 as discussed above.

The operation at the right side of FIG. 10 is similar to that at the left side, except that it is for a situation where the VCR is initially turned on. If during block 204 the microprocessor detects a signal from VIDEO OUT connector 22 blocks 206a and 208a are entered where a set of IR codes for one type of VCR is selected from Table 24e and the turn off signals from the selected set of IR codes are transmitted to the VCR attempting to turn the VCR off. During blocks 210a and 212a the microcomputer detects if a video signal is received from the VIDEO OUT connector 22 and, if not, it is unknown that the correct set of IR codes from Table 24e have been selected and blocks 216 and 218 are entered where the corresponding set of IR codes from Table 24e is selected for future use in operating the hand-held controller.

If during block 212a the microcomputer detects that a video signal is still present at the VIDEO OUT connector 22, block 214a is entered where the next set of IR codes is selected from Table 24e. The signals for turning off the VCR from the selected set of IR codes is transmitted during block 208a to the VCR following which blocks 210a and 212a are entered as discussed above.

Figure 11:
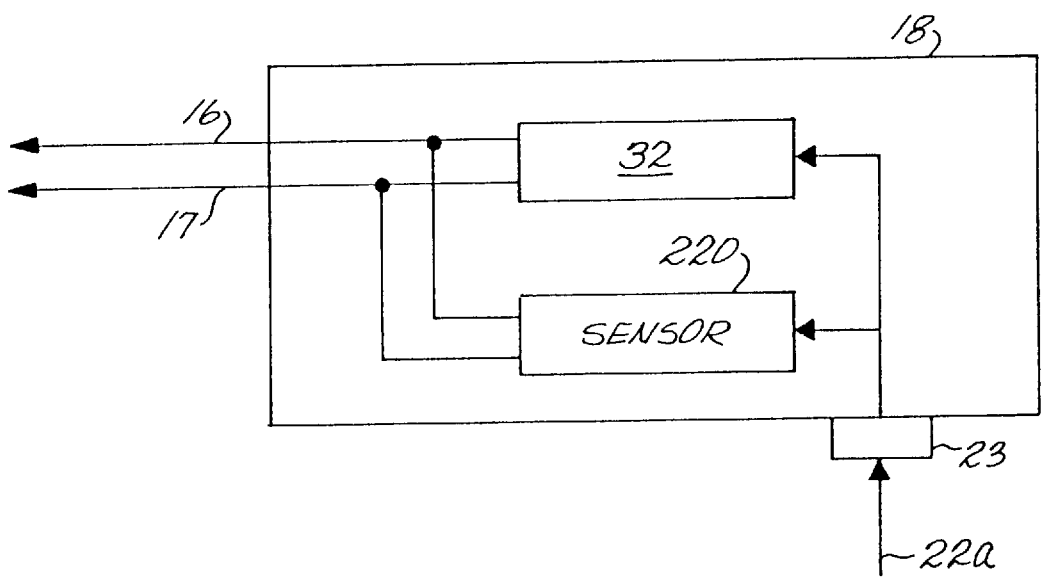
FIG. 11 is a block diagram of an alternate base unit.

The presence of video signals from VIDEO OUT connector 22 may be detected by the microcomputer in a number of different ways. One way in which this may be done is to add a sensor or detector, such as 220 as in FIG. 11, which senses whether a video signal is present on cable 22a connected to the VIDEO OUT connector 22 and forms a special coded signal through pins 16 and 17 to the microcomputer.

Another way in which this may be done is by having the microcomputer programmed to transmit an actual channel select signal, via transmitter 34, to VCR 44 causing the tuner 42 to switch to the selected actual channel and causing a VPS label from the corresponding program to be extracted by the VPS detector 32. The microcomputer is programmed to compare a given known VPS label with extracted VPS labels from the selected actual channel. When equality is detected it is known that the tuner, and hence the VCR 44, has been turned on.

Another approach would be for the microcomputer to cause the transmitter 34 to transmit a sequence of different actual channel select signals causing the tuner 42 to switch to the corresponding actual channels in sequence. The microcomputer is programmed in this example to monitor the extracted VPS signals until any VPS label is detected as being present. If any VPS label is detected it is assumed that the VCR is turned on. If no VPS labels are detected, then it is assumed that the VCR is not on.

Although the automatic selection of IR codes has been described with reference to control of a VCR, such as that depicted in FIG. 3, automatic selection of IR codes may be employed for other types of consumer electronic devices, such as washers, dryers, automatic thermostat control devices etc. In each of these devices a feedback would be provided from the consumer electronic device to the controller which is selecting the codes to indicate when the device has been properly turned on or turned off or otherwise properly activated, following which the corresponding set of IR codes would be used for controlling the consumer electronic device.

The apparatus and methods of the present invention and their intended advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof.

What is claimed is:

1. In a multi-channel television environment in which program information labels are included in at least some of the television channels, a method for programming a controller for selecting, from a plurality of sets of infra red (IR) codes where each set is for communicating with a different television channel selector, of one of such sets of IR codes for subsequent control of IR signal communication with the corresponding television channel selector, and wherein each such television channel selector includes a tuner, which when tuned to an actual channel of broadcast video signals, provides video signals derived from such actual channel to a video output thereof, the method comprising the steps of:

providing to the television channel selector a selected IR code which is selected from one of the sets of IR codes and causes the television channel selector to tune to a predetermined actual channel, electrically monitoring the video output of the television channel selector for a program information label;

comparing at least a portion of the program information label which was provided the video output of the television channel selector for a predetermined relation; and selecting the correct set of IR codes, from which the selected IR code was selected and resulted in the predetermined relation, and then using said correct set of IR codes for subsequent signal communication with the television channel selector.

2. The method of claim 1 comprising the step of repeating the steps of tuning and comparing using a different actual channel and a different given program label.

3. The method of claim 1 comprising the step of repeating the steps after tuning the tuner to a different channel.

4. In a multi-channel television environment in which program information labels are included in at least some of the television channels, a controller for selecting from a plurality of sets of infra red (IR) codes, where each IR code set is for communicating with a different corresponding television channel selector, of one of said sets of IR codes for subsequent control of IR signal communication with the corresponding television channel selector, and wherein each such television channel selector includes a tuner which, when tuned to an actual channel of broadcast video signals, provides video signals derived from such actual channel to a video output thereof, the controller comprising:

a code selector for providing to said television channel selector a signal predetermined by a selected IR code which is selected from one of the sets of IR codes for causing the television channel selector to tune to a predetermined actual channel over which a predetermined program information label is expected to be received;

a monitor for electrically monitoring the video output of the television channel selector;

a comparator for comparing the predetermined actual channel with the program information label which was provided the video output for a predetermined relation; and a selector for selecting the correct set of IR codes, from which the selected IR code was selected and resulted in the predetermined relation, and then using said correct set of IR codes for subsequent signal communication with the television channel selector.

5. The controller of claim 4 wherein the means for tuning is operative for tuning to a different actual channel and the monitor is operative for comparing using a different given program label.

6. The controller of claim 4 wherein the means for tuning tunes the tuner to a sequence of different channels.

7. In a multi-channel television environment in which program information labels are included in at least some of the television channels, a method for programming a controller to select, from a plurality of sets of infra red (IR) codes where each set is for communicating with a different television channel selector of, one of such sets of IR codes for subsequent control of IR signal communication with the corresponding television channel selector, wherein each such television channel selector includes a tuner, which when tuned to an actual channel of broadcast video signals, provides video signals derived from such actual channel to a video output thereof, the method comprising the steps of:

providing to the television channel selector a selected IR code which is selected from one of the sets of IR codes and causes the television channel selector to tune to a predetermined actual channel;

electrically monitoring the video output of the television channel selector to detect the presence of a program information label;

selecting the correct set of IR codes, from which the selected IR code was selected and resulted in the detection of the presence program information label in the video output of the television channel selector and then using said correct set of IR codes for subsequent signal communication with the television channel selector.

8. In a multi-channel television environment in which program information labels are included in at least some of the television channels, a controller for selecting from a plurality of sets of infra red (IR) codes, where each IR code set is for communicating with a different corresponding television channel selector of, one of said sets of IR codes for subsequent control of IR signal communication with the corresponding television channel selector, and wherein each such television channel selector includes a tuner which, when tuned to an actual channel of broadcast video signals, provides video signals derived from such actual channel to a video output thereof, the controller comprising:

a code selector for providing to said television channel selector a signal predetermined by a selected IR code which is selected from one of the sets of IR codes for causing the television channel selector to tune to a predetermined actual channel over which a predetermined program information label is expected to be received;

a monitor for electrically monitoring the video output of the television channel selector to detect the presence of a program information label;

a selector for selecting the correct set of IR codes, from which the selected IR code was selected and resulted in the detection of the presence of a program information label in the video output of the television channel selector, and then using said correct set of IR codes for subsequent signal communication with the television channel selector.

\* \* \* \* \*

UNITED STATES PATENT AND TRADEMARK OFFICE
CERTIFICATE OF CORRECTION

PATENT NO. : 5,852,478
DATED : December 22, 1998
INVENTOR(S) : Daniel S. Kwoh

It is certified that error appears in the above-identified patent and that said Letters Patent is hereby corrected as shown below:

Title page, Item [54], Title and Column 1, lines 2-3,
The title should read:

-- AUTOMATIC UNIVERSAL REMOTE CONTROLLER ELECTRICALLY MONITORS THE OUTPUT OF A CHANNEL CHANGER AND USES PROGRAM LABELS IN THE VBI
TO SELECT A SET OF IR CODES --.

Column 1,
Line 56, change "represent" to -- represents --.

Column 2,
Line 4, after "controller" delete "in".

Column 3,
Line 18, replace "bene" with -- been --.
Line 53, change "broadcasted" to -- broadcast --.

Column 5,
Line 16, change "broadcasted" to -- broadcast --.
Line 46, replace "a NEC" with -- an NEC --.
Line 62, change "broadcasted" to -- broadcast --.

Column 6,
Lines 34, 37, change "broadcasted" to -- broadcast -- (both occcurrences).

Column 7,
Line 16, after "22 to 25" delete the period.
Lines 64-65, after "steps 64" change "at sequence" to -- et sequence --.
Line 67, change "GCODE," to --G-CODE, --.

UNITED STATES PATENT AND TRADEMARK OFFICE
CERTIFICATE OF CORRECTION

PATENT NO. : 5,852,478
DATED : December 22, 1998
INVENTOR(S) : Daniel S. Kwoh

It is certified that error appears in the above-identified patent and that said Letters Patent is hereby corrected as shown below:

Column 10,
Line 12, change "correspondence" to -- corresponding --.

Signed and Sealed this

Twenty-fifth Day of June, 2002

Attest:

Attesting Officer

JAMES E. ROGAN
Director of the United States Patent and Trademark Office